United States Patent [19]

Schill

[11] 4,408,519
[45] Oct. 11, 1983

[54] APPARATUS FOR SLICING BACON OR THE LIKE

[75] Inventor: Herman Schill, Kehl, Fed. Rep. of Germany

[73] Assignee: Maja Maschinenfabrik Hermann Schill GmbH, Kehl-Goldscheuer, Fed. Rep. of Germany

[21] Appl. No.: 266,095

[22] Filed: May 21, 1981

[30] Foreign Application Priority Data

May 29, 1980 [DE] Fed. Rep. of Germany ....... 3020351

[51] Int. Cl.³ .......................................... A22C 17/12
[52] U.S. Cl. ..................................... 99/486; 83/874; 83/DIG. 1; 99/492; 99/589; 99/596
[58] Field of Search ................... 99/584–590, 99/596, 540, 541, 489–492, 486; 17/21, 24, 50, 52; 83/874, 868, 648, DIG. 1, 544

[56] References Cited

U.S. PATENT DOCUMENTS 3,733,997  5/1973  Beasley .............................. 99/588
4,188,870  2/1980  Schill ................................. 99/589

FOREIGN PATENT DOCUMENTS 1278873  5/1969  Fed. Rep. of Germany.

Primary Examiner—Philip R. Coe
Assistant Examiner—Timothy F. Simone
Attorney, Agent, or Firm—Kontler, Grimes & Battersby

[57] ABSTRACT

Apparatus for slicing or skinning bacon, fish or like products has a frame which supports an adjustable knife downstream of an endless belt conveyor serving to deliver successive products along a horizontal path into the range of a rotary traction wheel which is driven to advance the products past the knife. A rotary hold-down device with a row of elastic discs is installed in a shroud which normally overlies the knife and the traction wheel as well as at least a portion of the conveyor and is mounted on two pairs of levers which enable the hold-down device to move in parallelism with as well as at right angles to the upper reach of the conveyor so that the discs can conform to the configuration of the upper side of a product approaching and moving past the knife. The shroud is biased to maintain the hold-down device in a starting position close to the cutting edge of the knife in the absence of products in the path. To this end, one pair of levers is connected with a coil spring which urges such levers against a first stop in the frame. The other pair of levers is of variable length and each such lever is connected with a second spring tending to reduce the length of the respective lever whereby the shroud is urged against a second stop on the frame. The product is fed through a channel which has several mutually inclined portions and is further configurated and/or dimensioned in such a way that the hand of an operator which extends through the channel cannot reach the severing station.

26 Claims, 11 Drawing Figures

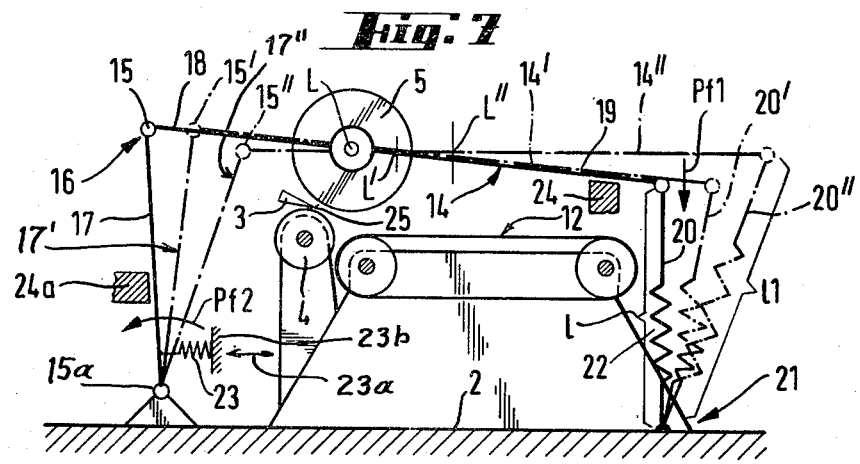
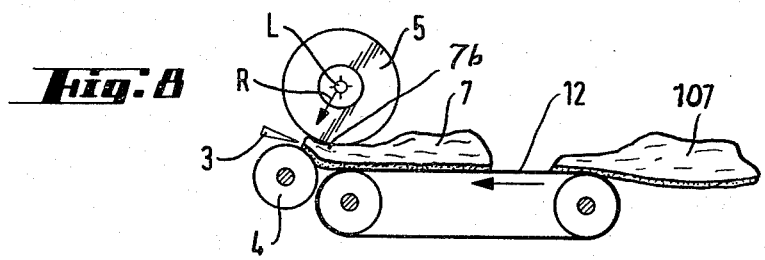
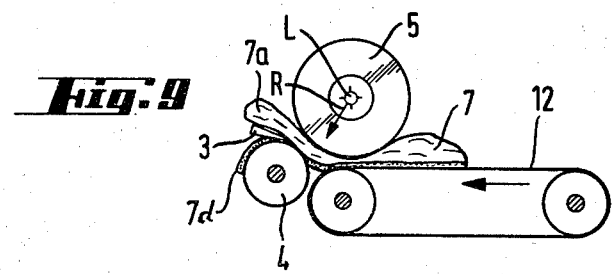
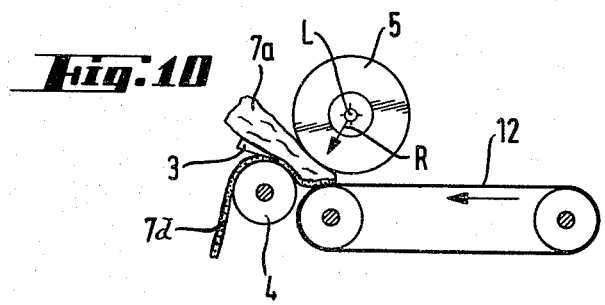

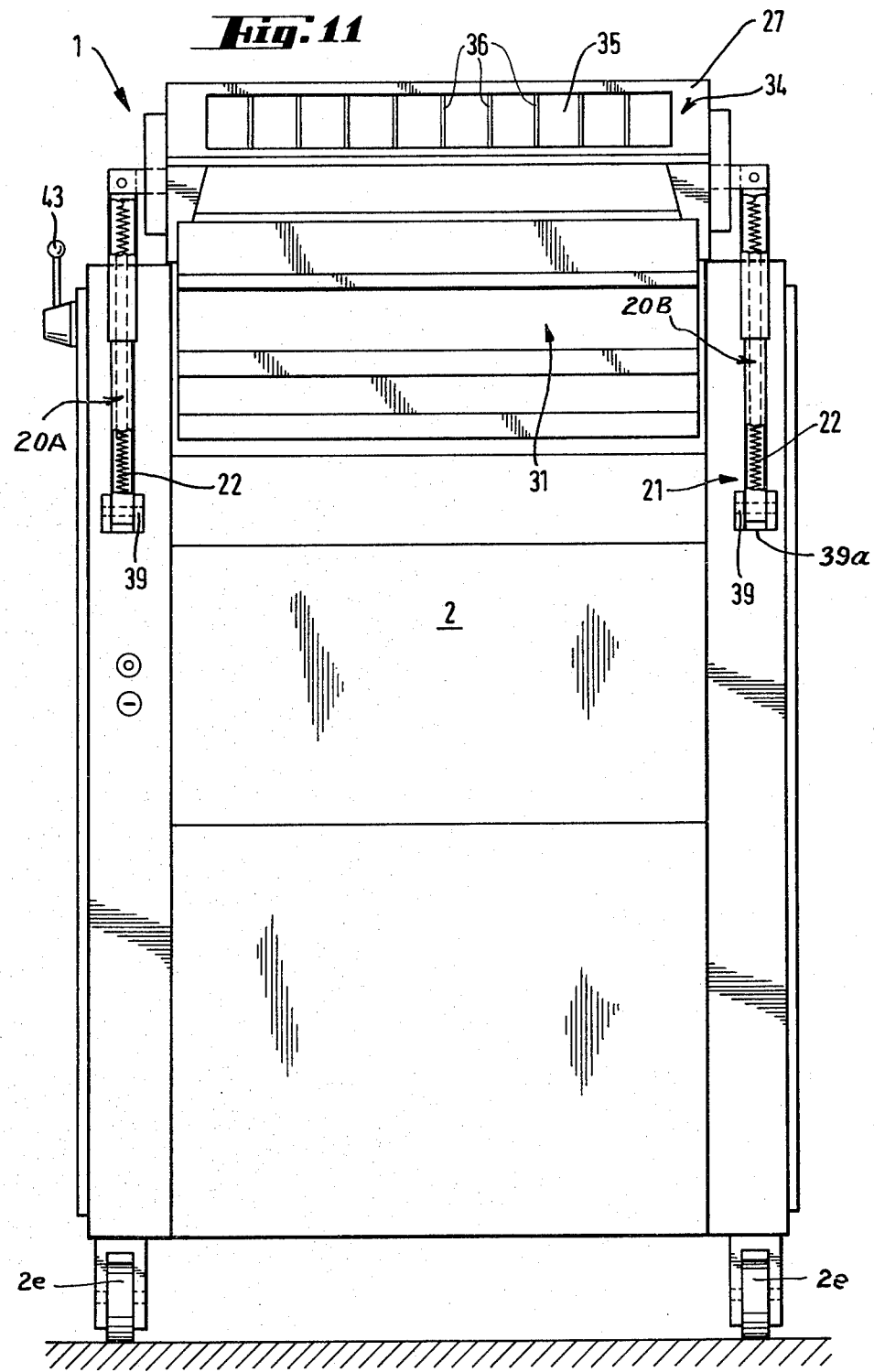

APPARATUS FOR SLICING BACON OR THE LIKE

CROSS-REFERENCE TO RELATED CASES

Bacon slicing or skinning machines of the class to which the present invention pertains are disclosed in commonly owned U.S. Pat. Nos. 4,123,959 (granted Nov. 7, 1978 to Hermann Schill for "Slicing machine for bacon or the like") and 4,188,870 (granted Feb. 19, 1980 to Hermann Schill for "Skinning machine for bacon or the like").

BACKGROUND OF THE INVENTION

The present invention relates to apparatus for slicing, skinning or similarly treating fish, slabs of bacon or analogous products. More particularly, the invention relates to improvements in apparatus of the type wherein a preferably adjustable knife cooperates with a traction wheel and a hold-down device to convert a slab of bacon or an analogous product (hereinafter called product for short) into smaller pieces, especially slices, and wherein the product is delivered by a feeding unit, such as an endless belt conveyor. Still more particularly, the invention relates to improvements in apparatus of the above outlined character wherein at least the region immediately upstream of the knife and traction wheel is normally unaccessible to the hands of attendants.

Apparatus of the above outlined character are used, among others, to remove rinds from slabs of bacon or like products, to remove skin from fish and/or for similar purposes. It is desirable to design such apparatus with a view to allow for processing of differently configurated and/or dimensioned products, i.e., not only fish or slabs of bacon but also round pieces such as hams. As a rule, it is necessary to carry out at least some alterations before a presently known bacon slicing or skinning machine can be used to remove slices or skin from a ham, i.e., from the upper part of the leg of a pork or another animal. Furthermore, it is often desirable to remove skin together with a layer of bacon thereon, i.e., the apparatus should be capable of skinning as well as removing skin with a layer of edible material.

The commonly owned U.S. Pat. No. 4,188,870 discloses a bacon skinning machine wherein the product to be treated is placed onto a relatively long conveyor and a portion of the conveyor is surrounded by a cage having a length which at least equals the length of the arm of a grown person so that the attendant cannot reach the severing station. This practically eliminates the likelihood of injury to the hand or hands of an attendant, even if a careless attendant attempts to insert his or her fingers between the cage and the conveyor in order to push and/or orient the product which is about to enter the severing or skinning station.

German Offenlegungsschrift No. 24 20 188 discloses a modified apparatus wherein the means for preventing access to the severing station when the apparatus is in actual use comprises a funnel-shaped product supplying channel the inlet portion of which is vertical or nearly vertical and the remaining portion of which is substantially horizontal so that the operator is incapable of extending his or her arm through the thus configurated channel in order to reach the severing station. The channel is adjacent to an elongated endless conveyor forming part of the product feeding unit.

The aforedescribed conventional apparatus exhibit certain serious drawbacks. Thus, the relatively long endless conveyor of the feeding unit in the apparatus of Schill contributes to the bulk and space requirements of the apparatus. Moreover, a relatively long conveyor of the product feeding unit contributes to the initial as well as maintenance cost (because the surfaces to be cleaned are larger). Still further, the hold-down or biasing means in the apparatus of Schill do not exhibit a sufficient degree of mobility or adjustability to allow for proper engagement and retention of differently configurated and/or dimensioned products. As a rule, the hold-down device of such conventional apparatus is merely designed to perform a movement along an arcuate path which forms part of a circular path. Moreover, the endless conveyor of the apparatus which is disclosed in the aforementioned patent to Schill is capable of performing certain movements which are desirable only during the initial stage of penetration of the knife into a slab of bacon or the like.

The apparatus of the aforementioned Offenlegungsschrift does not embody any means for permitting adjustments of the endless conveyor which forms part of the feeding unit. The only adjustment which is contemplated in the apparatus of this reference is that between the feeding plane for the products on the one hand and the traction wheel and hold-down roller on the other hand in a direction to change the thickness of slices which are to be separated from the product. Here, too, the hold-down device cannot readily conform to the configuration of a product, especially if such configuration deviates from the standard shape. Since the funnel-shaped product supplying channel of the apparatus which is disclosed in the Offenlegungsschrift is closed at both sides so that is provides a relatively narrow path for the introduction of a product, the latter is often subjected to substantial deforming stresses during introduction into the channel and thence into the range of the skinning or slitting knife. Additional deformation of the product takes place during transport between the traction wheel and the hold-down roller because neither of these components can be adjusted within a reasonably wide range. Finally, the channel, the conveyor of the feeding unit, the traction wheel and the hold-down device prevent an attendant from observing all phases of the severing operation so that the product is often skinned or sliced into portions of undesirable or unsatisfactory size and/or shape.

OBJECTS AND SUMMARY OF THE INVENTION

An object of the present invention is to provide an apparatus for skinning, slicing or like treatment of fish, pieces of bacon or analogous food products whose versatility greatly exceeds the versatility of heretofore known apparatus.

Another object of the invention is to provide an apparatus which, though more versatile than heretofore known apparatus, enables an attendant to observe each and every phase or stage of processing of a product which has been advanced into the range of the severing instrumentality.

A further object of the invention is to provide the apparatus with novel and improved means for mounting the hold-down device in such a way that the latter can readily follow the outlines of large, small, round, flat, oddly or normally configurated products.

An additional object of the invention is to provide an apparatus which can be used for skinning or slicing of bacon or analogous products as well as for removal of skin together with a layer of edible material thereon.

Still another object of the invention is to provide the apparatus with novel and improved means for preventing access to the severing station so that a careless or unskilled attendant is not likely to be injured when the apparatus is in actual use.

A further object of the invention is to provide an apparatus of the above outlined character wherein the hold-down device can properly engage and bias a product even if the position of the cutting edge of a knife or an analogous severing tool is changed within a wide range, either preparatory to or during introduction of a slab of bacon or the like.

Another object of the invention is to provide an apparatus which is at least as compact as heretofore known apparatus in spite of its superior versatility, which occupies a relatively small amount of floor space, and which can be used as a superior substitute for heretofore known apparatus.

The invention resides in the provision of an apparatus for skinning, slicing or analogous treatment of bacon, fish or like products. The apparatus comprises a frame or housing, a knife which is preferably adjustably mounted in the frame so that it can separate thicker or thinner slices from a product which is fed into its range, a conveyor or other suitable means for feeding the product along an elongated path (preferably along a substantially horizontal path) toward and into the range of the knife, a preferably rotary hold-down device adjacent to the knife and to the feeding means and serving to engage a product which is advanced toward and is severed by the knife, means for movably mounting the hold-down device so that the latter is capable of performing movements in a plurality of directions (preferably substantially transversely of as well as in parallelism with the elongated path) in response to engagement by a product which is in the process of advancing toward and thereupon moves past the knife, and coil springs and/or other suitable means for yieldably biasing the hold-down device to a predetermined starting position which the hold-down device assumes in the absence of a product in the path (or at least in the absence of a product in that portion of the path which is sufficiently close to the hold-down device).

The apparatus preferably further comprises a traction wheel for the products, and such traction wheel is installed between the feeding means and the knife to advance those portions of a product which have been moved beyond the discharge end of the feeding means. Still further, the apparatus preferably comprises a shroud or analogous means for normally shielding the knife, the traction wheel, the hold-down device and at least a portion of the feeding means against direct access to thus eliminate or reduce the likelihood of injury to an attendant. In accordance with an advantageous feature of the invention, the shroud may form part of the means for moving the hold-down device, i.e., the hold-down device can be rotatably mounted in the shroud and the latter can be movably secured to the frame.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 7 is a diagrammatic view of the means for movably supporting the hold-down device, the latter being shown in its starting position;

FIG. 8 is a schematic side elevational view of the severing station, with the hold-down device shown in a position it assumes during the initial stage of a slicing or skinning operation;

FIG. 9 is a similar view of the severing station but showing a further stage of skinning of the product;

FIG. 10 illustrates the structure of FIG. 8 or 9 but during a further stage of processing shortly prior to completion of a skinning or slicing operation; and FIG. 11 shows the structure of FIG. 2 but with the shroud in operative position.

DESCRIPTION OF THE PREFERRED EMBODIMENTS

Figure 1:
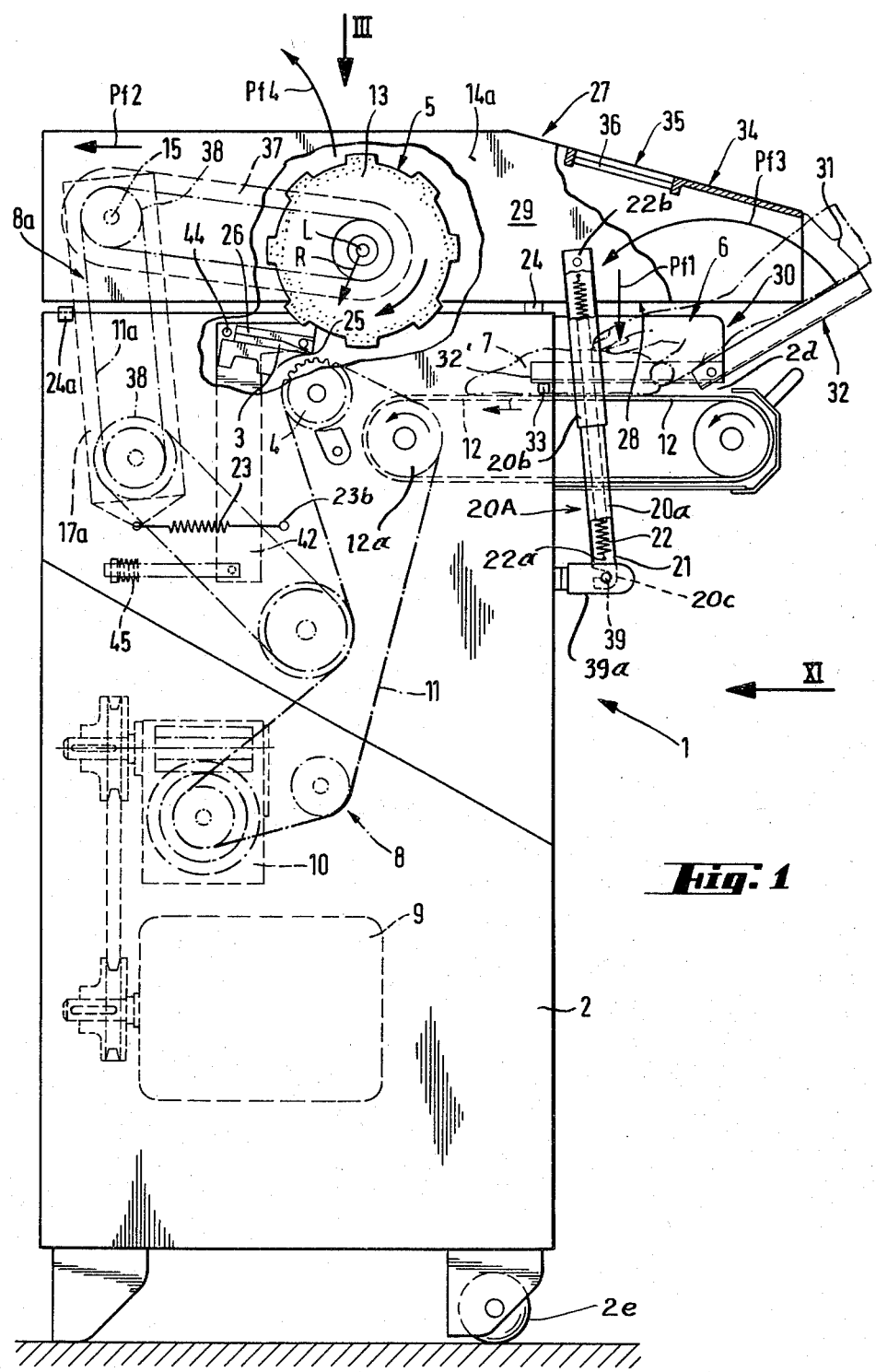
FIG. 1 is a schematic partly side elevational view (see the arrow I in FIG. 2) and partly vertical sectional view of an apparatus which embodies the invention.

FIG. 1 shows a slicing or skinning apparatus 1 which can be used for the processing of meat or fish and comprises a frame or housing 2 mounted on wheels 2e so that it can be readily shifted to different locales of use. The upper portion of the frame 2 supports, at a proper level, a skinning or slicing tool 3 (hereinafter called knife), a rotary advancing or traction element 4 (hereinafter called wheel or traction wheel), a rotary biasing or hold-down device 5, and a feeding unit 6 including a relatively long endless belt conveyor 12. The cutting edge 25 of the knife 3 is substantially horizontal and is located at a level between the traction wheel 4 and hold-down device 5. The substantially horizontal upper reach of the belt conveyor 12 is located at a level somewhat below the cutting edge 25. The knife 3 is mounted on an adjustable holder 26. A slab of bacon or an analogous product to be sliced or skinned is indicated by broken lines, as at 7.

The major part of the drive means 8 for various moving parts of the apparatus 1 is installed in the lower portion of the frame 2, i.e., at a level below the severing station accommodating the knife 3, the hold-down device 5 and the traction wheel 4. The drive means 8 comprises a prime mover 9 (e.g., a variable-speed electric motor), a transmission 10 whose input element receives torque from the shaft of the prime mover 9, and motion transmitting means including an endless chain 11 which rotates the front pulley 12a of the belt conveyor 12, a sprocket wheel of the traction wheel 4 and a sprocket wheel of a portion 8a forming part of the drive means 8 and serving to rotate the hold-down device 5.

Figure 2:
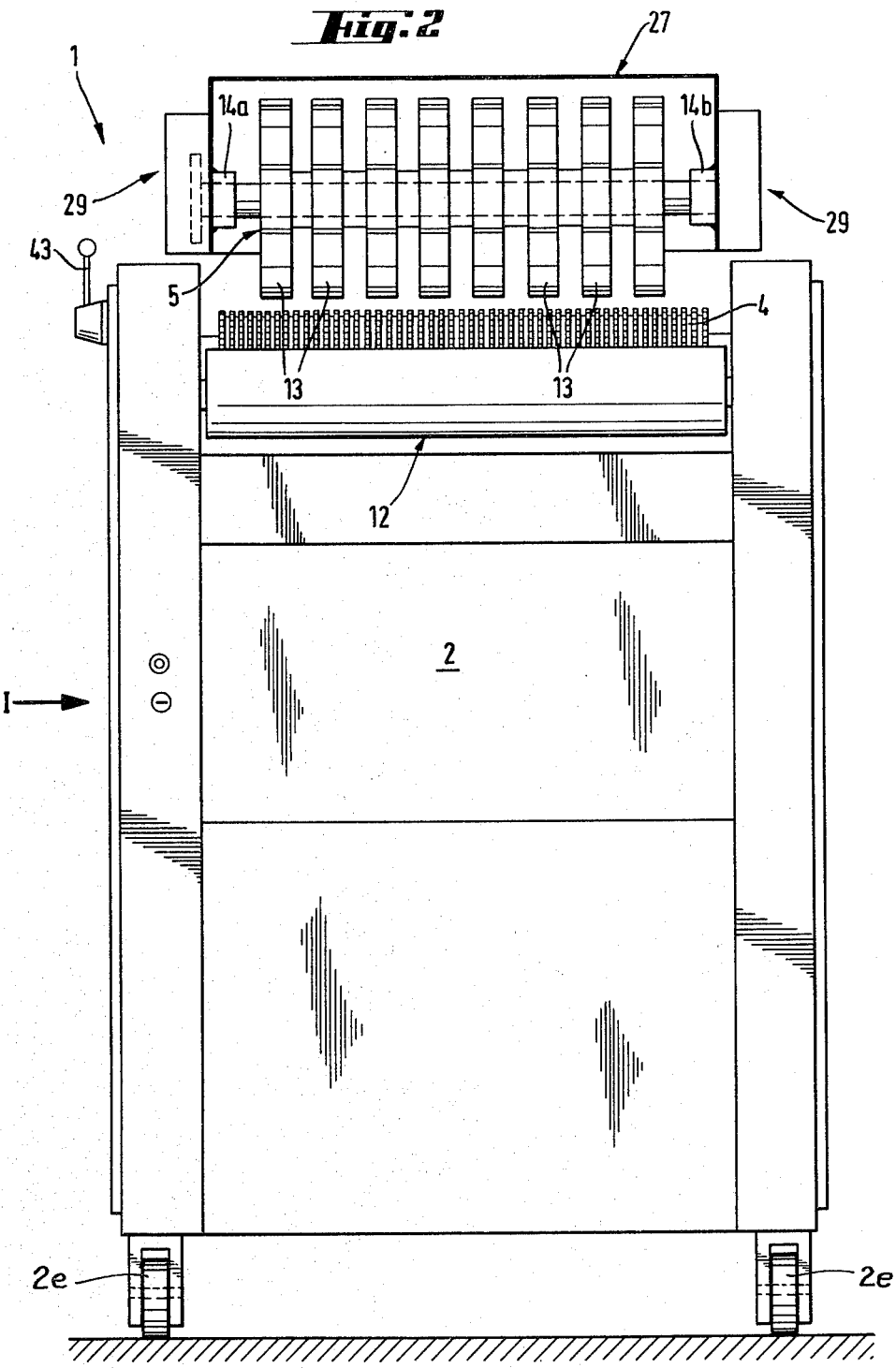
FIG. 2 is an end elevational view of the apparatus as seen from the right-hand side of FIG. 1, with the shroud for the severing station omitted.

In accordance with a feature of the invention, the hold-down device 5 is adjustable in several directions with reference to the knife 3, traction wheel 4 and conveyor 12 (i.e., also with reference to a product 7 on the horizontal upper reach of the conveyor 12). The directions in which the hold-down device 4 is adjustable will be explained in greater detail with reference to FIGS. 7 to 10. The reference character R denotes in FIG. 1 the direction of a restoring force which acts upon the hold-down device 5 in the general direction of the cutting edge 25 of the knife 3 so as to urge a product 7 which has penetrated between the parts 4 and 5 in a direction against the periphery of the traction wheel 4 and hence to an optimum position with reference to the cutting edge 25. Reference may be had to FIGS. 4, 5, 8, 9 and 10 which show that the just discussed adjustability of the hold-down device 5, as well as the forces jointly acting in the direction of arrow R, ensure that the device 5 can properly engage and bias a product while the latter advances toward and through the severing station. The axis of rotation of the hold-down device 5 in its mounting means is shown at L; this axis is common to an entire row of parallel discs 13 (FIG. 2) which consist of rubber or other suitable elastomeric material and form part of the hold-down device 5. The adjustability of the hold-down devide 5 is such that the latter can readily conform to the outlines of upper sides of relatively thick, relatively thin, rounded or flat products 7 during transport of successive increments of such products into the range of the cutting edge 25. The elasticity of discs 13 enables the hold-down device 5 to readily conform to the configuration of a product 7 as considered at right angles to the direction of forward movement of the product with and beyond the upper reach of the conveyor 12.

FIG. 7 shows that the shaft which defines the axis L of the hold-down device 5 is mounted on and between the arms 18, 19 of a schematically illustrated two-armed lever 14. The left-hand arm 18 of the lever 14 is connected to a horizontal pivot member 15 at the upper end 16 of a one-armed lever 17 the lower end portion of which is articulately connected to the frame 2 by a pivot member 15a. The lever 17 is biased by a helical spring 23 which acts in the direction of arrow Pf2 and tends to maintain the lever 17 in engagement with a fixed stop 24a in the frame 2. The right-hand arm 19 of the lever 14 for the hold-down device 5 is connected to the upper end portion of an extensible and contractible one-armed lever 20 the lower end portion of which is articulately connected to the frame 2, as at 21. The lever 20 comprises two telescopically connected tubular sections 20a, 20b (see FIG. 1) which confine a helical spring 22 tending to shorten the lever 20 and to thereby urge the arm 19 of the lever 14 against a fixed stop 24 in the frame 2 (see the arrow Pf1). The hold-down device 5 is maintained in its starting or idle position (as shown in FIG. 7 by solid lines) when the lever 17 engages the stop 24a and the arm 19 of the lever 14 engages the stop 24. When the axis L of the hold-down device 5 is moved to the position L' of FIG. 7, the levers 14, 17 and 20 respectively assume the positions 14', 17' and 20'; and the pivot 15 assumes the position 15' the lever 17 is then remote from the stop 24a but the arm 19 continues to engage or remains close to the stop 24. When the axis of the hold-down device 5 assumes the position L'', the lever 17 is even more remote from the stop 24a (see the positions 14'', 15'' and 17'' of the parts 14, 15 and 17) and the lever 20 assumes the position 20''. If the position 20'' is the fully extended position of the lever 20, the length of this lever can vary between the values l and $l_1$ shown in FIG. 7. It will be noted that, when the lever 20 is fully extended, the arm 19 of the lever 14 is remote from the respective stop 24. Thus, the hold-down device 5 is adjustable in such directions that the arm 18 of the lever 14 is movable in and counter to the direction of transport of a product 7 with the upper reach of the conveyor 12, as well as that the arm 19 of the lever 14 is movable toward and away from the upper reach of the conveyor 12. Movements of the lever 14 in and counter to the direction which is indicated by the arrow Pf2 entail a movement of the lowermost point of the hold-down device 5 nearer to and further away from the cutting edge 25 of the knife 3; movements of the sections 20b in and counter to the direction indicated by the arrow Pf1 shown in FIG. 7 entail movements of the lowermost point of the hold-down device 5 nearer to and upwardly and away from the upper reach of the conveyor 12. The restoring force R is furnished primarily by the spring 22, i.e., by the means which tends to shorten the lever 20 for the right-hand end portion of the lever 14.

The levers 14, 17 and 20 can be said to constitute a modified version of a parallel motion wherein one of the fixed links (lever 20) is of variable length. The ability of the hold-down device 5 to move in substantial parallelism with the upper reach of the conveyor 12 as well as substantially at right angles to such upper reach can be further readily ascertained by looking at FIGS. 8, 9 and 10. In FIG. 8, the hold-down device 5 is located in its leftmost position and at a first level above the conveyor 12. As the leading end of the foremost product 7 advances beyond the cutting edge 25, i.e., as the cutting edge 25 penetrates into the material of the foremost product 7, the hold-down device 5 moves rearwardly and downwardly owing to the configuration of the upper side of such foremost product so that the skin layer at the underside of the product 7 is properly urged against the upper reach of the conveyor 12 and against the periphery of the rotating traction wheel 4. This ensures that the knife 3 separates from the major portion of the foremost product 7 a strip or slice 7d of requisite thickness. The aforedescribed movability of the hold-down device 5 enables the latter to properly follow the outline of each and every portion of the foremost product 7, including the rearmost or trailing portion (see FIG. 10). The reference character 107 denotes in FIG. 8 the next-following product which follows the product 7 and is spaced apart therefrom by a distance which suffices to allow the hold-down device 5 to reassume its starting or idle position of FIG. 7 in which the lever 17 engages the stop 24a under the action of the spring 23 and the arm 19 engages the stop 24 under the action of the spring 22.

Each disc 13 of the hold-down device 5 can flex independently of the other discs (this can be readily ascertained by looking at FIG. 2); such flexibility of its discs enables the device 5 to fully or adequately engage the upper side of a product 7 and to follow the outline of the upper side of such product regardless of whether the product is round, flat or undulated, as considered in the longitudinal and/or transverse direction of the upper reach of the conveyor 12. The feature that the hold-down device 5 can yield by moving upwardly, forwardly or rearwardly against the opposition of the spring 22 and/or 23 ensures that the product 7 is not subjected to excessive deforming action during transport toward and past the cutting edge 25 of the knife 3, even if the height of the product varies at random and within a very wide range. In its starting or idle position, the hold-down device 5 is preferably positioned in such a way that its lowermost point is located slightly above the level and slightly upstream of the cutting edge 25 (note FIG. 7). The discharge end (pulley 12a) of the conveyor 12 is located slightly ahead of the cutting edge 25 so that the last stage of transport of a product 7 toward and into the range of the knife 3 is carried out by the traction wheel 4. The hold-down device 5 can cooperate with the traction wheel 4 to advance successive increments of the product 7 into the range of the knife 3. A relatively thin leader of a product 7 will cause no displacement or will cause negligible displacement of the hold-down device 5 in a direction upwardly and away from the plane of the upper reach of the conveyor 12. Once the cutting edge 25 has penetrated into a relatively thick leader 7b (see FIG. 4 or 8) of the oncoming product 7 and the cutting edge 25 has started the separation of a slice 7d from the product, the remaining (relatively thick) portion 7a of the product 7 penetrates between the upper side of the knife 3 and the hold-down device 5 and causes the latter to move upwardly (i.e., to lengthen the lever 20 by expanding the spring 22) as well as to pivot the lever 17 in a clockwise direction (as viewed in FIG. 7) so that the spring 23 stores energy while the lever 17 moves away from the stop 24a. In other words, a relatively thick portion 7a will cause the lever 14 to pivot counterclockwise at the pivot point 15 and, at the same time, the lever 17 is caused to pivot clockwise at the point 15a, i.e., in the region where the lever 17 is articulately connected to the frame 2. As the hold-down device 5 moves rearwardly, it ensures that successive increments of the product 7 lie properly against the upper reach of the conveyor 12 as well as against the adjacent portion of the traction wheel 4. The hold-down device 5 can subject the product 7 to a desirable smoothing or equalizing action without excessive deformation or actual squashing of the material of the product. Such equalizing action under the bias of the hold-down device 5 which is urged downwardly by the spring 22 contributes to uniformity and hence to the quality of the ultimate product, namely, the skinned portion 7a alone or the skinned portion 7a as well as the portion 7d if the distance between the periphery of the traction wheel 4 and the cutting edge 25 is selected with a view to ensure that the separated skin which enters into and advances in the gap between the underside of the knife 3 and the periphery of the traction wheel 4 carries a layer of edible material. The aforementioned mounting of the hold-down device 5 (movability in at least two directions including substantially at right angles to as well as in substantial parallelism with the upper reach of the conveyor 12) has been found to be highly advantageous during severing of the trailing portion of the product (see FIG. 10), i.e., the device 5 continues to properly hold the product all the way to the rear end of the material to be severed. In fact, the spring 23 can begin to contract as soon as the lowermost portion of the hold-down device 5 starts to track the rear edge face of the product 7 so that the lever 17 begins to pivot counterclockwise, as viewed in FIG. 7, and the device 5 actually pushes the trailing end of the product toward the cutting edge 25. As mentioned above, the springs 22, 23 cooperate to automatically return the hold-down device 5 to the starting position of FIG. 7 as soon as the trailing end of a product has moved sufficiently close to the cutting edge 25, i.e., as soon as the spring 23 is free to contract to the extent which is necessary to move the lever 17 into engagement with the stop 24a. The spring 22 is free to return the rear portion 19 of the lever 14 into engagement with the stop 24 as soon as the hold-down device 5 begins to track a relatively thin portion of the product or as soon as the trailing end of the product has advanced sufficiently close to the cutting edge 25 to allow for a reduction of the length of the lever 20 to the value 1. The operation of the apparatus need not be interrupted during feeding of the next-following product 107 into the range of the cutting edge 25 of the knife 3, i.e., a fresh product 107 can be placed onto the upper reach of the belt conveyor 12 close to the rear or trailing end of the preceding product 7 as long as the distance between successive products suffices to enable the hold-down device 5 to reassume its starting position under the action of the springs 22 and 23.

The bias of the spring 22 and/or 23 is preferably adjustable. This is indicated in FIG. 7 for the spring 23 wherein the double-headed arrow 23a denotes an adjusting device which is capable of moving the retainer 23b for the spring 23 in and counter to the direction of the arrow Pf2, i.e., to change the amount of energy which the spring 23 stores when the lever 17 engages the stop 25'. The bias of the spring 22 can be varied by moving the post or stud 22b for the uppermost convolution of the spring 22 lengthwise of the respective upper tubular section 20b and/or by moving the post or stud 22a for the lowermost convolution of the spring 22 lengthwise of the lower section 20a of the expandible and contractible lever 20.

In accordance with the presently preferred embodiment of the invention, the upper reach of the conveyor 12 is horizontal or substantially horizontal and is located at a level which is most convenient to the attendant, i.e., so that the attendant can readily placed successive products 7, 107, etc. onto the conveyor 12 without excessive lifting of arms or without bending over in order to deposit successive products onto the feeding unit 6.

In accordance with another feature of the invention, the means for mounting the hold-down device 5 in the aforedescribed manner is normally confined within a substantially closed hood or shroud 27. When the shroud 27 is maintained in the operative position of FIG. 1, its open underside 28 is at least substantially closed by the frame 2 and by the feeding unit 6. The two longitudinally extending side walls 29 of the shroud 27 constitute two spaced-apart parallel two-armed levers 14a and 14b (FIG. 2) which together constitute the two-armed lever 14 schematically shown in FIG. 7, i.e., the shaft for the hold-down device 5 is mounted in the side walls or levers 14a, 14b of the shroud 27. This means that the entire shroud 27 is turnable about the axis of the pivot member 15. The left-hand end portion of the shroud 27, as viewed in FIG. 1, is mounted on two discrete one-armed levers 17a, 17b (see FIG. 3) which together constitute the schematically illustrated lever 17 of FIG. 7, and the right-hand end portion of the shroud 27 is mounted on two discrete levers 20A, 20B each of which is expansible and contractible and is analogous to the schematically illustrated lever 20 of FIG. 7. The lower end portions of the levers 20A, 20B are hooked, as at 20C (see FIG. 1) and normally engage stationary retaining or coupling pins 39 provided on brackets 39a secured to and extending rearwardly from the frame 2. An attendant can readily disengage the hooked end portions 20C from the respective retaining pins 39 preparatory to pivoting of the shroud 27 about the axis of the pivot member 15. Such pivoting (in a counterclockwise direction, as viewed in FIG. 1) results in exposure of the parts 12, 4 and 3 at the severing station because the hold-down device 5 shares the pivotal movement of the shroud 27. The shroud 27 is held in the operative position of FIG. 1 when the apparatus 1 is in actual use so that the parts (3, 4, 5, 12) which are likely to injure or lead to injury of the operator's hand are not accessible when the prime mover 9 of the drive means 8 is on. The apparatus 1 can be readily designed in such a way that the prime mover 9 is arrested in automatic response to detachment of hooked end portions 20C from the respective retaining pins 39 or in response to pivoting of the shroud 27 from the operative position of FIG. 1.

In order to further reduce the likelihood of injury to an operator, the shroud 27 defines a channel or tunnel 30 through which successive products are fed onto the upper reach of the conveyor 12 which then advances such products into the range of the hold-down device 5, knife 3 and traction wheel 4. The height, width and/or length of the channel or tunnel 30 is selected in such a way that the operator is incapable of extending his or her hand or hands through the channel and all the way into the range of the cutting edge 25. Alternatively, or in addition to the just outlined precautionary measures involving the dimensioning of the channel 30, the latter can be made relatively short but can be placed at such a distance from the severing station that a hand which has been introduced into and moves beyond the channel 30 cannot reach the severing station. The reference character 31 denotes in FIG. 1 the height of the channel 30; this height is preferably such that, even if the hands of an operator can pass therethrough, the operator cannot introduced his or her arms to the extent which is needed to enable the hands to advance into the range of the knife 3. In many instances, the channel 30 is L-shaped (i.e., it includes several mutually inclined portions) so that it is even more difficult to reach the cutting edge 25 by extending a hand into, through and beyond the channel. In the illustrated embodiment, the channel 30 is bounded from below by a plate-like bottom wall or chute 32 which slopes downwardly and forwardly toward the upper reach of the conveyor 12. The upper side of the channel 30 is bounded by a rearwardly and downwardly sloping top wall or rear wall 34 of the shroud 27. A product which is placed onto the plate-like chute 32 can slide therealong and onto the upper reach of the conveyor 12 which transports such product to the severing station, i.e., into the range of the traction wheel 4 which cooperates with the hold-down device 5 to ensure adequate slicing or skinning of the product. A once-treated product (e.g., a product whose skin was removed during the first passage through the apparatus) can be introduced one or more times so that the knife 3 severs successive slices until the entire product is consumed or when the remnant of the product is deemed to be too small or too irregular to warrant renewed introduction into the channel 30. An attendant stands or sits behind the apparatus 1, i.e., to the right of the channel 30, as viewed in FIG. 1.

The arrow Pf3 denotes in FIG. 1 the direction in which the plate-like chute 32 can be pivoted on lifting of the shroud 27 so that the chute 32 can assume a position of substantial parallelism with the upper side of the upper reach of the conveyor 12. To this end, the left-hand end portion of the chute 32 is pivotally connected to a rearward extension 2d of the frame 2. Such rearward extension can include two upright parallel plates or panels which may constitute the side walls of the channel 30. Thus, a portion (34) of the channel 30 can be defined by the shroud 27 and the remaining portion of the channel can be defined by the frame 2 and/or by parts which are fixedly (see 2d) or movably (see 32) secured to the frame. The folded over position of the chute 32 above the upper reach of the conveyor 12 is indicated in FIG. 1 by broken lines (see 32'); the chute 32 then abuts against a stop 33 of the frame 2.

The top or rear wall 34 of the shroud 27 is preferably provided with an observation opening or window 35 which enables the attendant standing behind the frame 2 to monitor the progress of the slicing or skinning operation at the severing station. The opening 35 preferably contains a grate 36, a lattice or the like to prevent insertion of a hand therethrough.

Figure 3:
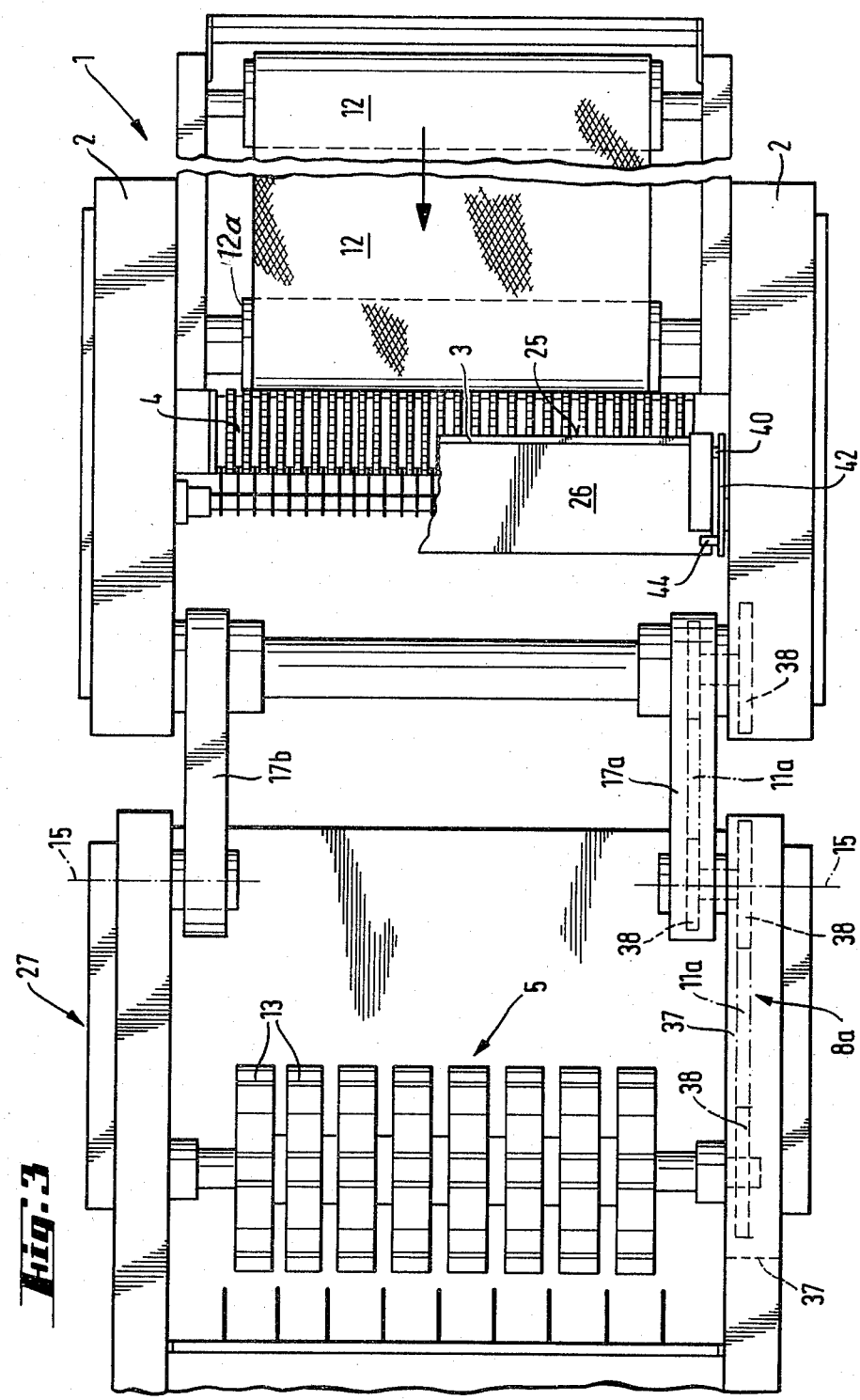
FIG. 3 is an enlarged plane view of the apparatus, as seen in the direction of arrow III in FIG. 1, with the shroud pivoted through 180 degrees from its operative position.

The aforementioned portion 8a of the drive means 8 which serves to transmit motion to the rotary hold-down device 5 is shown in greater detail in FIGS. 1 and 3. The lever 17a of the means for pivotally supporting the left-hand end portion of the shroud 27 (lever 14), as viewed in FIG. 1, is preferably hollow and accommodates certain parts of the portion 8a. Certain other parts of the portion 8a are mounted in the frame 2 as well as in a gear box or casing 37. The casing 37 is closed or substantially closed and is installed in the interior of the shroud 27. The portion 8a includes several endless chains 11a and several sprocket wheels 38. The drive means 8 is preferably designed with a view to ensure that the movements of the hold-down device 5 are synchronized with those of the traction wheel 4, i.e., that the peripheral speed of the discs 13 forming part of the device 5 matches the peripheral speed of the wheel 4.

An advantage of the provision of certain parts of the portion 8a of drive means 8 in the hollow lever 17a and in the casing 37 which is mounted on the shroud 27 is that the latter can be readily pivoted from its operative position without it being necessary to remove any parts of the drive means and the hold-down device 5 is ready to rotate as soon as the shroud 27 is returned to the operative position.

FIG. 3 illustrates a portion of the underside of the shroud 27. The shroud 27 is held in an inoperative position at an angle of approximately 180 degrees from the operative position of FIG. 1. The direction in which the shroud 27 must pivot toward the inoperative position of FIG. 3 is indicated by the arrow Pf4 shown in FIG. 1. The entire hold-down device 5 is then fully exposed for inspection, cleaning and/or repair. Furthermore, such pivoting of the shroud 27 to the inoperative position of FIG. 3 enables an attendant to reach the knife 3, the entire conveyor 12 and/or the traction wheel 4, e.g., for the purpose of cleaning. If the designer of the apparatus 1 desires to even further reduce the likelihood of injury to an attendant when the apparatus is in use, the apparatus can be furnished with suitable locking means which permit disengagement of the levers 20A, 20B from the respective retaining pins 39 only on stoppage of the prime mover 9.

The knife holder 26 is adjustably mounted in the frame 2 of the apparatus 1. The means for adjusting the holder 26 includes a lever 43 (see FIGS. 2, 4, 5, 6 and 11) which is operatively connected with the holder 26 by an eccentric 43a. The holder 26 is turnable about the axes 41 of shafts 40 (see particularly FIG. 6). The shafts 40 are mounted in levers 42 or analogous carriers which, in turn, are adjustable by the aforementioned eccentric 43a in response to rotation of the lever 43 in a clockwise or counterclockwise direction, depending upon whether the attendant wishes to increase or reduce the distance between the cutting edge 25 of the knife 3 and the periphery of the traction wheel 4. As mentioned above, adjustability of the knife 3 and its holder 26 with reference to the traction wheel 4 is preferably sufficient to allow for true skinning of bacon or the like as well as for severing of a product 7 at such a distance from the underside of the skin that the latter is removed together with a layer of edible material at its upper side. The manner in which the knife 3 and its holder 26 are adjustable with reference to the traction wheel 4 is similar to that disclosed in German Pat. No. 1,278,873 to which reference may be had, if necessary.

The apparatus 1 is further provided with novel means for ensuring that the adjustable knife 3 and its holder 26 can be readily accommodated in the frame 2 at a level below the shroud 27 when the latter is held in the operative position of FIG. 1. It is to be borne in mind that the improved apparatus is or can be designed to occupy a minimum of floor space so that the component parts of the apparatus below the shroud 27 are rather closely adjacent to each other. The just mentioned means includes at least one stop 44 (see, for example, FIG. 6) which constitutes a means for limiting the extent of movement of the knife 3 in a direction toward the traction wheel 4. The stop or stops 44 are located in the path of movement of the respective lever or levers 42. A relatively strong spring 45 is provided to bias the levers 42 in a direction to move the cutting edge 25 toward the traction wheel 4. The holder 26 can yield when the knife 3 encounters excessive resistance to penetration of its cutting edge 25 into the material of the advancing product. Reference may be had again to the aforementioned German Pat. No. 1,278,873 which deals in detail with the kinematics of the mounting of an adjustable knife holder corresponding or analogous to the holder 26. The patented system employs two adjusting levers and two abutment levers in the region of the traction wheel and the knife. The provision of aforementioned stop means 44 for the lever or levers 42 renders it possible to operate with a single adjusting lever 43 and to dispense with the patented abutment levers. This is desirable because the omission of such levers provides more room for movements of the hold-down device 5 at the severing station, i.e., the device 5 has more room to follow the outline of a highly irregular product.

Referring again to FIGS. 1 and 7, it will be noted that, when the lever 17 abuts (or the levers 17a, 17b abut) against the stop 24a, the axis of the pivot member 15 is located to the left of its uppermost level, i.e., the lever 17 makes a small acute angle with a vertical plane which includes the axis of the pivot member 15a. This means that the hold-down device 5 must rise to a slightly higher level during the initial stage of its movement from the starting position of FIG. 1. It has been found that such design of the means for controlling the movements of the hold-down device 5 is desirable and advantageous. Basically, the lever 17 causes the hold-down device 5 to perform a movement along a substantially horizontal path or, more accurately, along a path which is at least substantially parallel to the upper reach of the conveyor 12. On the other hand, the extensible or contractible lever 20 (or levers 20A, 20B) enables the hold-down device 5 to perform movements in directions substantially at right angles to the upper reach of the conveyor 12.

Figure 4:
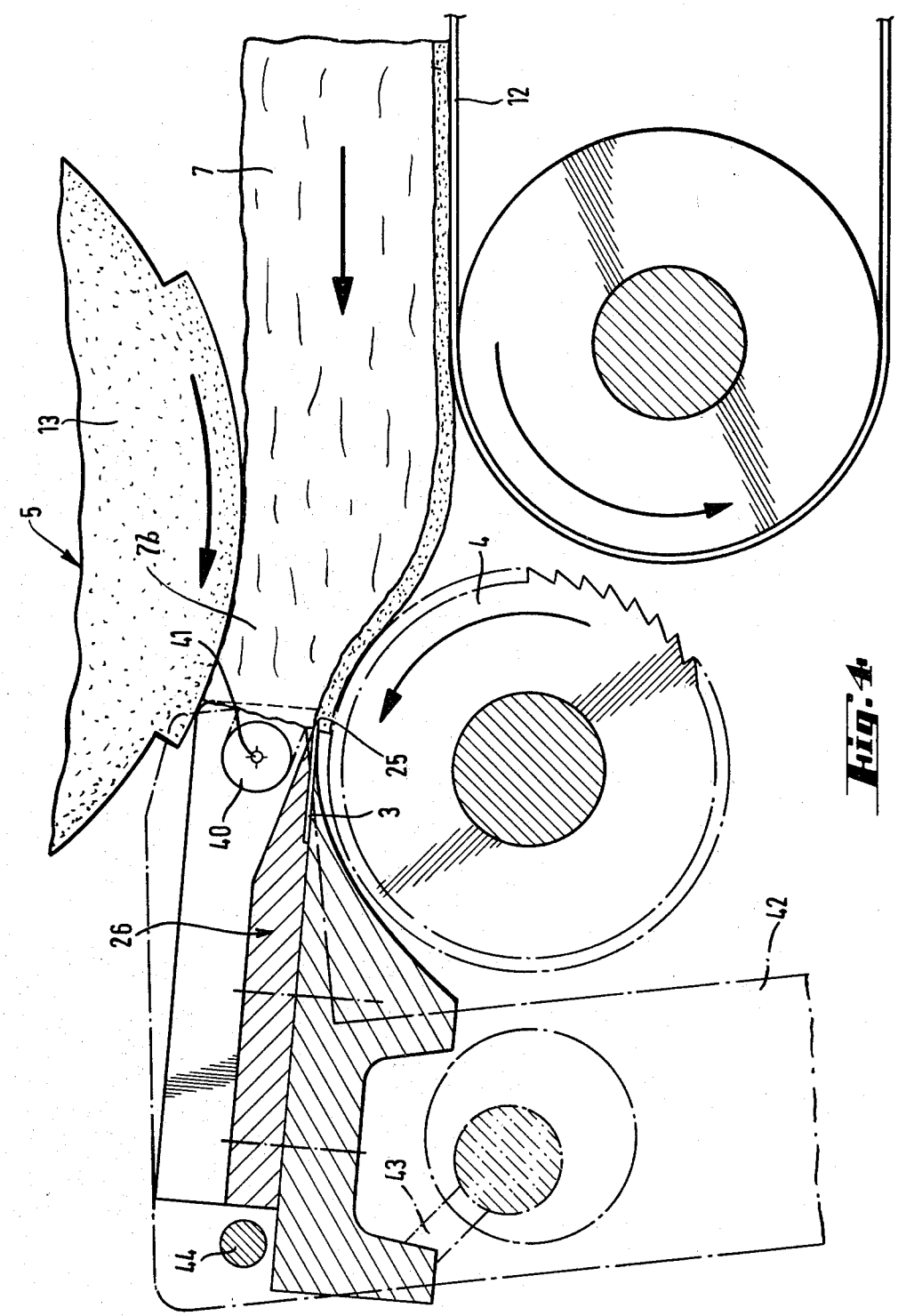
FIG. 4 is a greatly enlarged elevational view of the severing station in the apparatus of FIG. 1 with certain parts shown in section, a product being shown in a position it assumes during the initial stage of skinning.
Figure 5:
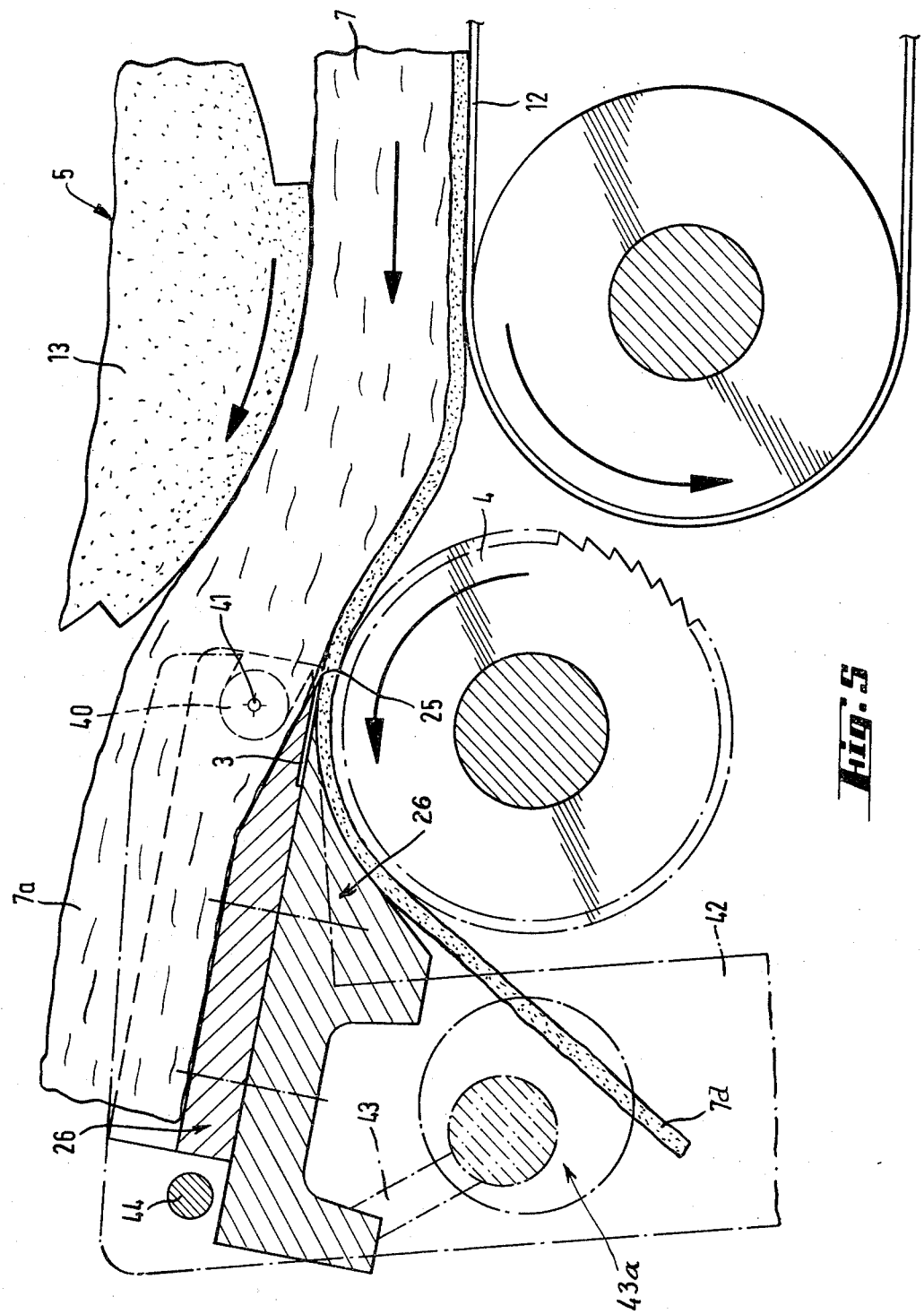
FIG. 5 illustrates the structure of FIG. 4 but during a further stage of the skinning operation.
Figure 6:
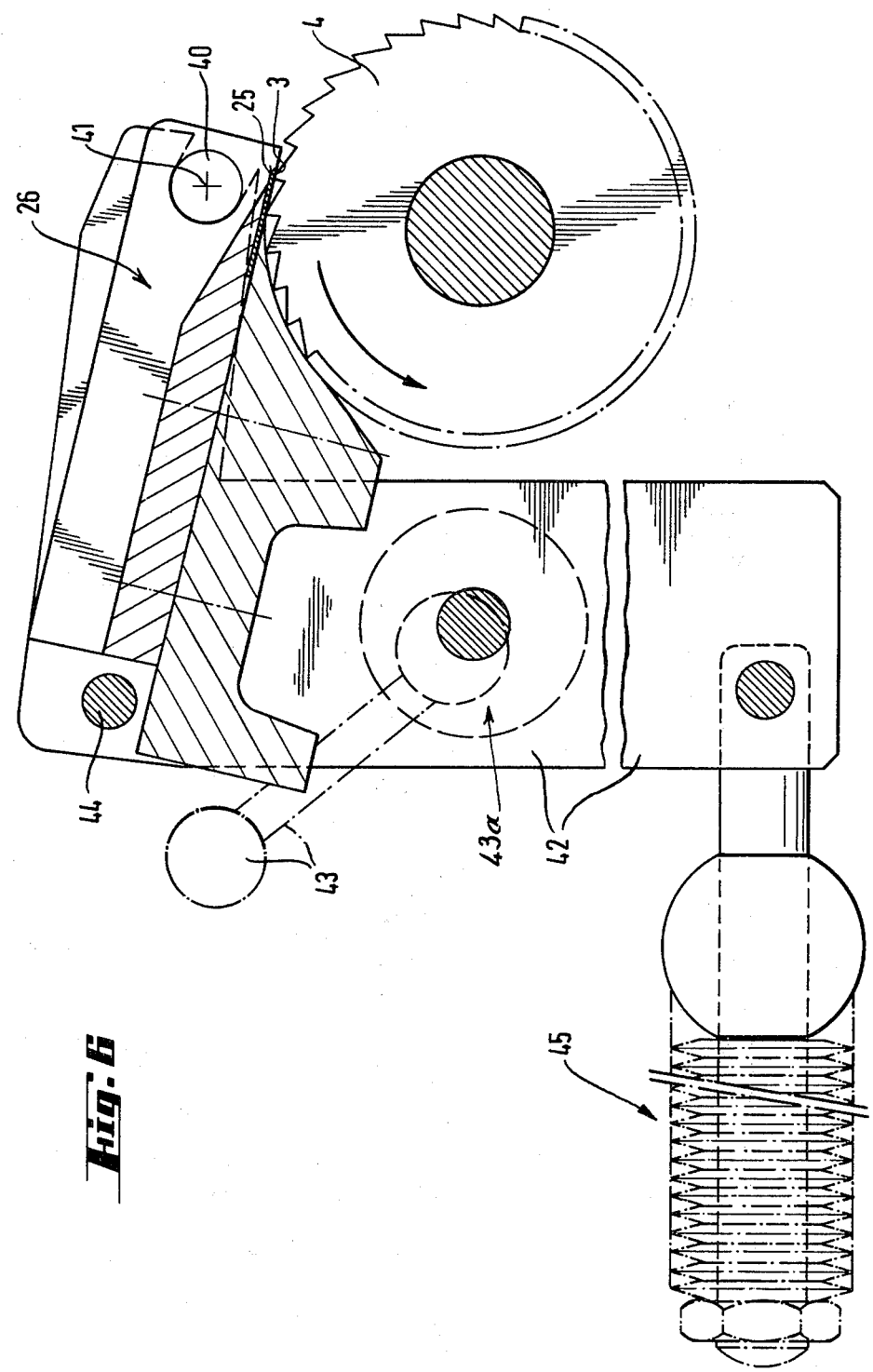
FIG. 6 is a fragmentary partly elevational and partly sectional view of the severing station, with the hold-down device and the conveyor of the feeding means omitted, and further showing the means for changing the position and orientation of the severing tool.

FIGS. 4 and 5 illustrate the parts at the severing station and respectively show the initial stage and an advanced stage of the skinning of a product 7. The dimensions of the parts shown in FIGS. 4 and 5 are drawn to scale or close to their true dimensions. During the initial stage of skinning, the hold-down device 5 urges the leader of the product 7 against the periphery of the traction wheel 4 in immediate proximity of the cutting edge 25 of the knife 3 (see FIG. 4). When the skinning operation progresses (see FIG. 5), the hold-down device 5 is located to the left of the position shown in FIG. 4 and urges the adjacent portion of the product 7 against the upper reach of the conveyor 12.

The shroud 27 need not be pivoted through 180 degrees (i.e., all the way to the position shown in FIG. 3) in order to afford access to some or all of the parts which are mounted in the frame 2. Thus, a pivoting of the shroud 27 through 100 degrees (in the direction of arrow Pf4 shown in FIG. 1) will normally or often suffice to expose the knife 3 and the traction wheel 4 so that such parts can be readily inspected, replaced or cleaned. Moreover, when the shroud 27 is moved to such position and the prime mover 9 continues to rotate the traction wheel 4 and to drive the conveyor 12, the attendant (who must exercise the necessary care) can treat round products (such as hams) or the attendant can skin fish, i.e., perform operations which cannot be performed by resorting to the aforediscussed conventional apparatus. The treatment of such products is an exception to the rule; nevertheless, the improved apparatus renders it possible to treat fish, hams or like products after completion of a very simple and short-lasting conversion of the apparatus, i.e., by the simple expedient of lifting the shroud 27 so that the hold-down device 5 does not prevent the introduction of a round ham or the like all the way into the range of the cutting edge 25 of the knife 3.

As explained above, the component parts of the apparatus can be cleaned in response to partial or complete pivoting of the shroud 27 from its operative position. At least some parts (such as the knife 3, its holder 26, the conveyor 12 and the traction wheel 4) can be readily cleaned when the shroud 27 is pivoted through an angle of, say, 90 degrees, and such parts (as well as the hold-down device 5) will be even more readily accessible after pivoting of the shroud 27 all the way to the position of FIG. 3. The entire knife holder 26 can be readily removed from the frame 2, either for more convenient cleaning or for replacement of the knife 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for skinning or analogous treatment of bacon or like products, comprising a frame; a knife mounted in said frame; means provided in said frame for feeding the product along an elongated path toward and into the range of said knife; a hold-down device adjacent to said knife and said feeding means and arranged to engage a product which is advanced toward and severed by said knife; means for movably mounting said device so that the latter can perform movements in a plurality of directions in response to engagement by a product which is in the process of advancing toward and thereupon moves past said knife, said mounting means including a shround for said knife and said feeding means, at least one first lever articulately connecting said shroud to said frame at one side of said knife and a second lever articulately connecting said shroud to said frame at the other side of said knife, as considered in the direction of transport of products along said path; means for separably coupling one of said levers to said frame so that said shroud can be pivoted to a position in which it exposes said knife and said feeding means upon uncoupling of said one lever from said frame; and means for biasing said device to a predetermined starting position which said device assumes in the absence of a product in said path.

2. The apparatus of claim 1, further comprising a traction wheel adjacent to said knife and arranged to advance those portions of the product which have been advanced beyond said feeding means.

3. The apparatus of claim 1, further comprising means for varying the bias of said biasing means.

4. The apparatus of claim 1, further comprising holder means for said knife, said holder means being installed in said frame and said feeding means comprising an elongated conveyor having a substantially horizontal product-advancing portion, said hold-down device being located at a level above said conveyor portion and close to said holder means in said starting position thereof.

5. The apparatus of claim 4, further comprising a traction wheel located downstream of said conveyor portion, as considered in the direction of advancement of products along said path, and operative to advance past said knife those parts of a product which have advanced beyond said conveyor portion, said hold-down device being adjacent to said traction wheel in the starting position thereof.

6. The apparatus of claim 5, further comprising stop means provided in said frame and defining said starting position for said hold-down device.

7. The apparatus of claim 1, wherein said hold-down device is rotatably installed in said shroud.

8. The apparatus of claim 7, wherein said shroud includes wall means defining at least one lever rotatably supporting said hold-down device.

9. The apparatus of claim 7, wherein said shroud is movable relative to said frame to and from an operative position and has an open side which affords access to said hold-down device and is at least substantially closed by said frame and said feeding means in the operative position of said shroud.

10. The apparatus of claim 1, further comprising a product admitting channel remote from said knife and configured and dimensioned to prevent the hand of an attendant from extending therethrough and into the range of said knife.

11. The apparatus of claim 10, wherein said channel has several mutually inclined portions.

12. The apparatus of claim 10, wherein said shroud overlies said knife and said hold-down device and defines a first portion of said channel, said channel further comprising a second portion which is movable relative to said feeding means.

13. The apparatus of claim 12, wherein said feeding means includes an endless conveyor having an elongated reach defining said path, said second portion of said channel including a chute which is movable between an inoperative position of substantial parallelism with said elongated reach and a second position in which said chute slopes downwardly toward said reach so that a product which is placed onto said chute in the second position of the latter can slide downwardly along the chute and onto said reach.

14. The apparatus of claim 1, wherein said device is rotatable in said mounting means and further comprising a rotary traction wheel mounted in said frame intermediate said feeding means and said knife, and drive means for rotating said traction wheel in synchronism with said device.

15. The apparatus of claim 1, wherein said shroud supports said hold-down device and normally overlies said knife and at least a portion of said feeding means, said shroud having an observation opening through which an attendant can observe the treatment of products by said knife.

16. The apparatus of claim 15, wherein said shroud has a top wall and said opening is a window in said top wall.

17. The apparatus of claim 15, wherein said shroud has a rear wall and said opening is a window in said rear wall.

18. The apparatus of claim 1, further comprising a rotary traction wheel mounted in said frame between said feeding means and said knife to advance those portions of the product which have advanced beyond said feeding means, a holder for said knife, and adjusting means for movably mounting said holder in said frame, said adjusting means including at least one lever pivotably mounted in said frame so as to enable the knife to move toward and away from said traction wheel and stop means provided in said frame in the path of movement of said lever to limit the extent of movement of said knife toward said traction wheel.

19. Apparatus for skinning or analogous treatment of bacon or like products, comprising a frame; a knife mounted in said frame; means provided in said frame for feeding the product along an elongated path toward and into the range of said knife; a hold-down device adjacent to said knife and said feeding means and arranged to engage a product which is advanced toward and severed by said knife; means for movably mounting said device so that the latter can perform movements in a plurality of directions in response to engagement by a product which is in the process of advancing toward and thereupon moves past said knife, said mounting means including first lever means supporting said device and second lever means articulately connected with said frame and with said first lever means, said first lever means comprising at least one two-armed lever and said device being mounted on said two-armed lever intermediate the arms thereof, said second lever means comprising at least one second lever having a first end articulately connected to said frame and a second end articulately connected to one arm of said two-armed lever, said mounting means further comprising at least one variable-length third lever having a first end articulately connected with said frame and a second end articulately connected with the other arm of said two-armed lever; and means for biasing said device to a predetermined starting position which said device assumes in the absence of a product in said path.

20. The apparatus of claim 19, further comprising means for normally shielding said knife and said hold-down device against access by the hands of an attendant when said feeding means is operative to advance products toward and into the range of said knife.

21. The apparatus of claim 19, wherein said biasing means includes resilient means operative to shorten said third lever in the absence of a resistance resulting from engagement between the product in said path and said hold-down device.

22. The apparatus of claim 19, further comprising stop means in said frame, said biasing means including means for yieldably urging said second lever means against said stop means in the starting position of said hold-down device.

23. The apparatus of claim 19, wherein said second lever means is pivotable relative to said frame to thereby move said hold-down device in directions of substantial parallelism with said path.

24. Apparatus for skinning or analogous treatment of bacon or like products, comprising a frame; a knife mounted in said frame; means provided in said frame for feeding the product along an elongated path toward and into the range of said knife; a rotary traction wheel mounted in said frame intermediate said feeding means and said knife; a hold-down device adjacent to said knife and said feeding means and arranged to engage a product which is advanced toward and severed by said knife; means for movably mounting said device so that the latter can perform movements in a plurality of directions in response to engagement by a product which is in the process of advancing toward and thereupon moves past said knife, said mounting means comprising a shroud rotatably supporting said device and at least one hollow lever articulately connecting said shroud to said frame; drive means for rotating said traction wheel in synchronism with said device, said drive means including parts mounted in said hollow lever and on said shroud; and means for biasing said device to a predetermined starting position which said device assumes in the absence of a product in said path.

25. The apparatus of claim 24, wherein said shroud comprises a casing for the parts of said drive means.

26. The apparatus of claim 24, wherein said parts include chains and sprocket wheels.

* * * * *